Oct. 3, 1944.　　　V. A. LARSEN　　　2,359,652
AIRPLANE DRIVE
Filed May 13, 1941　　　4 Sheets-Sheet 1
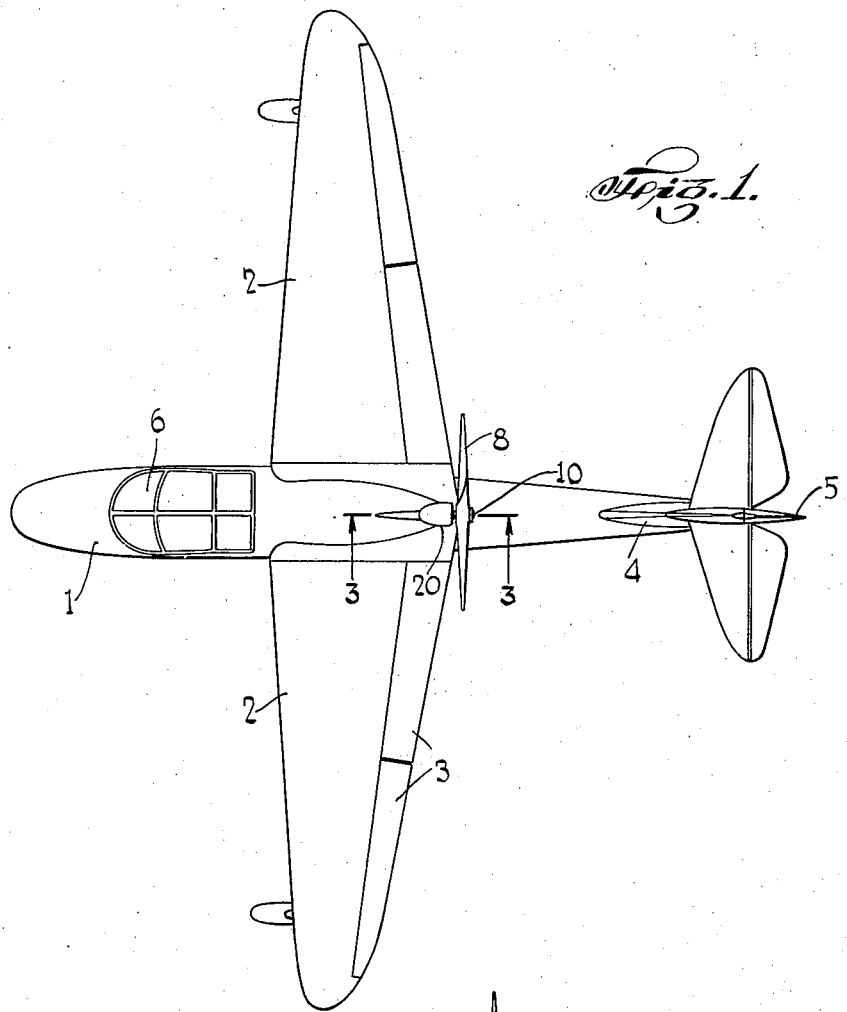
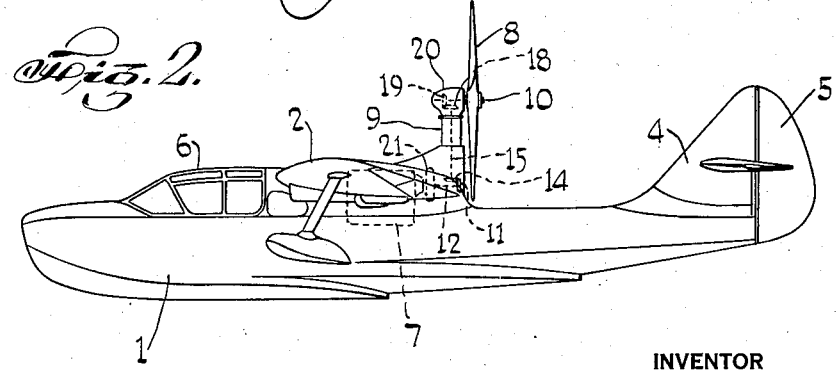
INVENTOR
VICTOR A. LARSEN

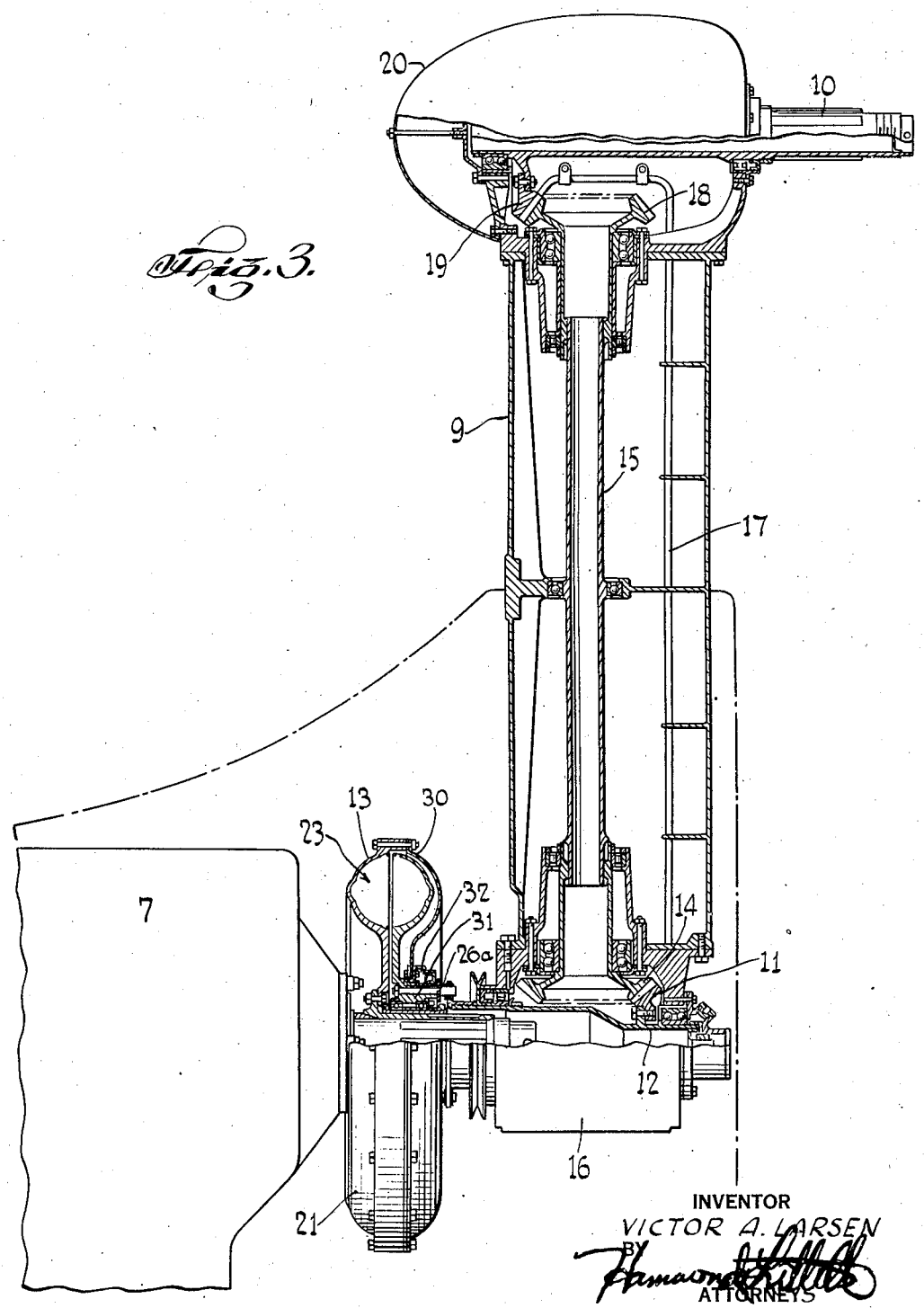

Oct. 3, 1944.  V. A. LARSEN  2,359,652
AIRPLANE DRIVE
Filed May 13, 1941  4 Sheets-Sheet 3
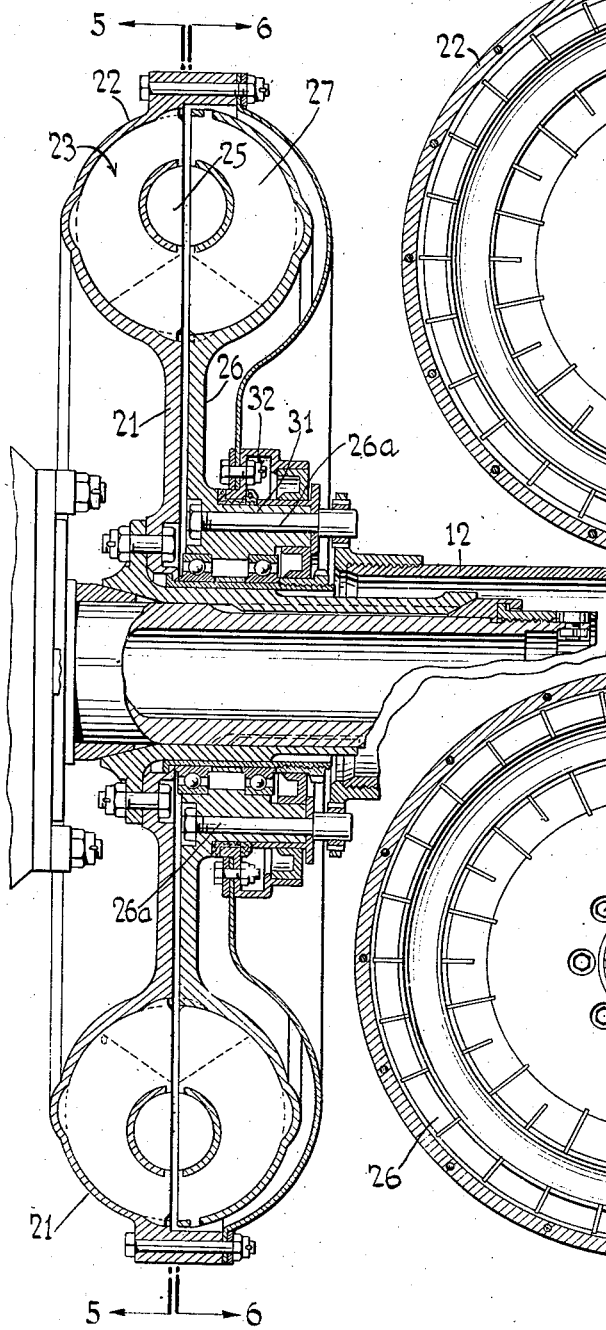
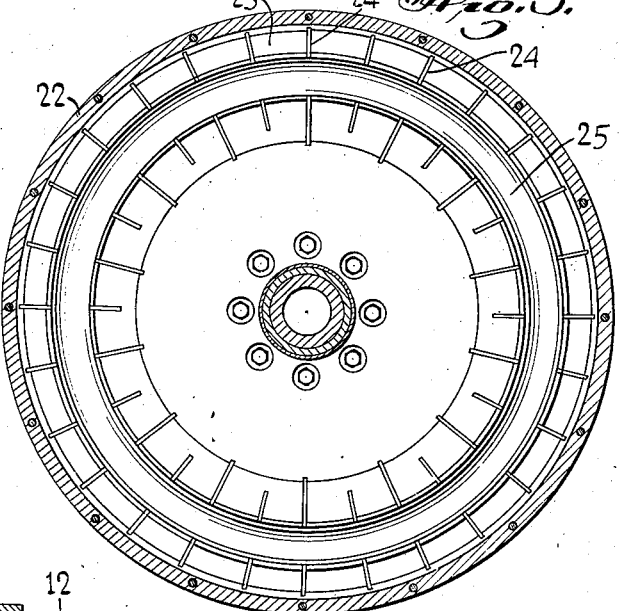
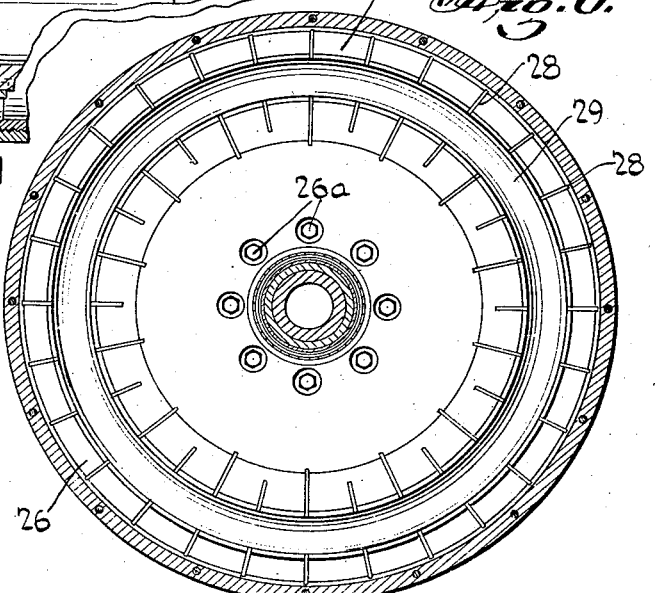
INVENTOR
VICTOR A. LARSEN
ATTORNEYS Oct. 3, 1944.   V. A. LARSEN   2,359,652
AIRPLANE DRIVE
Filed May 13, 1941   4 Sheets-Sheet 4

INVENTOR
VICTOR A. LARSEN
BY
ATTORNEYS

Patented Oct. 3, 1944

2,359,652

UNITED STATES PATENT OFFICE 2,359,652

AIRPLANE DRIVE

Victor A. Larsen, Amityville, N. Y., assignor, by mesne assignments, to Reconstruction Finance Corporation, New York, N. Y., a corporation of the United States Application May 13, 1941, Serial No. 393,153

5 Claims. (Cl. 244—55)

This invention relates to the drive means for airplanes in which the propellers are located at a distance from the engines and out of line with the axis of the crank shafts or the engines.

Various attempts have been made to build airplanes in which the propellers are not directly connected on the drive shaft of the engine or engines, but in which the propellers are located in the wings or above the airplane, or at some other place remote from the engine or engines and driven through drive gears, shafts, and the like.

The various airplanes of this design which have been proposed and built experimentally have not been successful in use because the location of the propeller or propellers at a distance from the engine and the introduction of remote driving means, such as gearing, drive shafts, and the like, introduces play between the engines and the propellers which accentuates the vibrations of the engine and the backlash from the propeller through the driving means, making airplanes of this type subject to a great deal more vibration than airplanes in which the propellers are mounted directly on the engine shaft.

It is an object of this invention to provide an airplane construction of the type in which the propeller is located at a distance from the engine and driven by remote drive means, such as gearing, drive shafts, and the like, and in which the vibration and backlash inherent in prior constructions of this kind are removed to such an extent as to make this type of airplane satisfactory for commercial uses.

Another object of the invention is to provide an airplane of the type in which the propeller or propellers are located at a distance from the engine and driven by remote driving means consisting of gearing, drive shafts, and the like, in which the vibration transmitted by the engines or the propellers to the airplane is reduced to a minimum by the use of a flexible drive connection between the engines and the propellers.

Another object of the invention is to provide an airplane of the type described in which the vibration transmitted from the engine or engines to the airplane, or from the propeller or propellers to the airplane is controlled or reduced by means of a fluid drive connection between the engine and the propeller.

Another object of the invention is to provide an airplane construction of the type described in which the engine or engines may be mounted in the body or fuselage of the airplane, and the propellers located in the wings or above the airplane, and driven from the engines without material vibration, so as to permit the successful manufacture of airplanes in which the pilot's forward view is not obstructed by the propeller or propellers.

Various other objects and advantages of the invention will appear as this description proceeds.

In the drawings which illustrate a simple form of embodiment of an airplane according to my invention:

Figure 1 is a plan view of a single propeller type of airplane, in which the engine is mounted in the fuselage of the airplane and the propeller is located at a distance remote from the engine;

Figure 2 is a side view of the airplane illustrated in Figure 1;

Figure 3 is a sectional view substantially on the line 3—3 of Figure 1, showing one form of remote driving connection and flexible coupling between the engine and the propeller;

Figure 4 is a sectional view showing in detail a form of fluid drive between the engine shaft and the propeller drive means;

Figure 5 is a sectional view substantially on the line 5—5 of Figure 4, showing the impeller or driving member of the fluid drive;

Figure 6 is a view substantially on the line 6—6 of Figure 4, showing the impelled or driven member of the fluid drive;

Figures 7, 8:
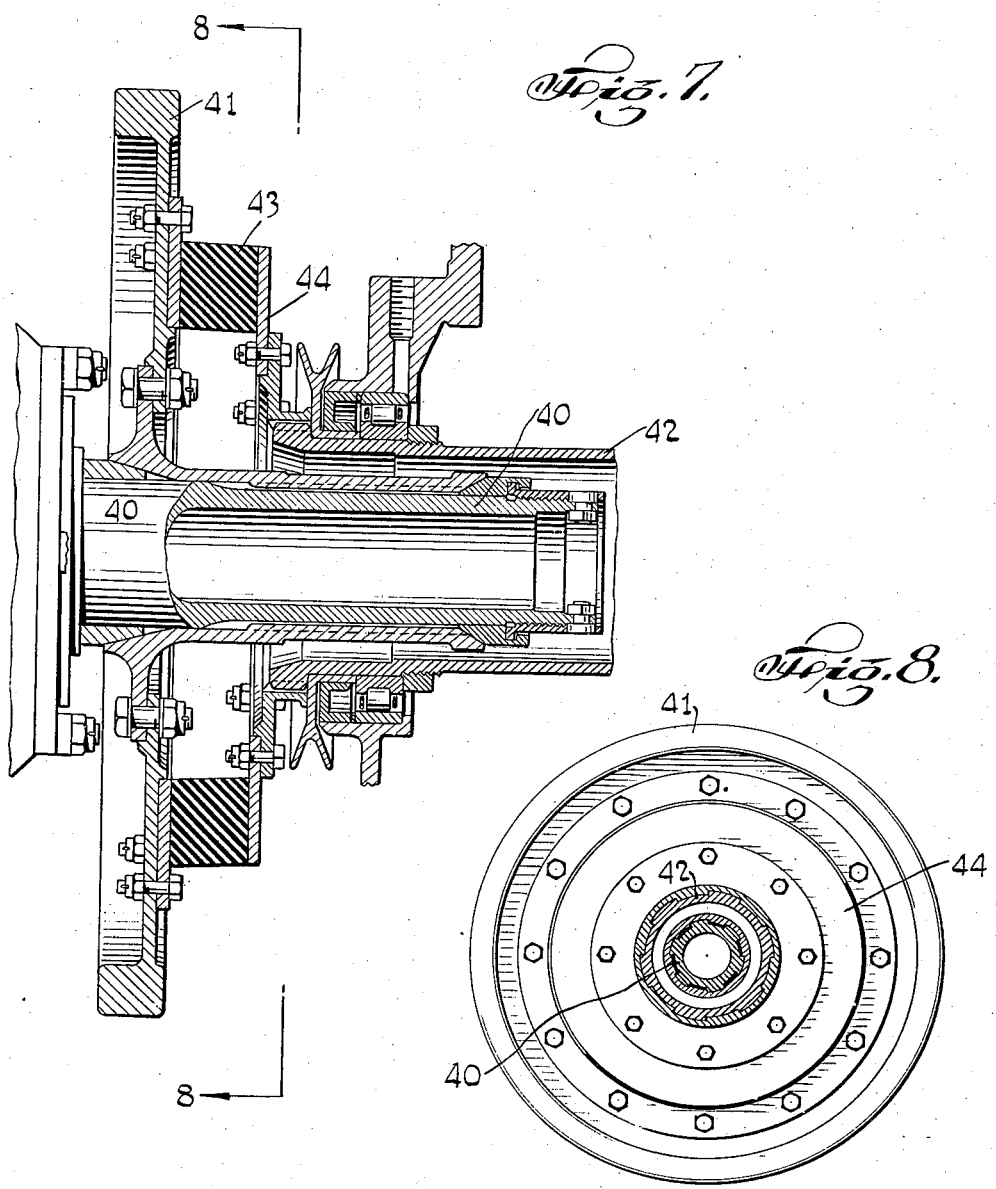
Figure 7 is a sectional view of another type of flexible coupling for use between the engine and the drive means of a remotely driven propeller.
Figure 8 is a sectional view along the line 8—8 of Figure 7.

In the form of embodiment of airplane chosen to illustrate the invention, in Figures 1 and 2 thereof the airplane consists of a fuselage 1 having the usual wings 2 with the ailerons 3, tail 4, rudder 5, and elevator with tail flaps, as in the usual design of airplane body construction. The cockpit 6 is located in the front of the fuselage with the engines and propellers in the rear thereof.

In this form of embodiment of my invention, the engine 7 is located within the fuselage and at the rear of the cockpit, and drives the propeller 8, which is preferably located above and at the rear of the wings of the airplane through a remote driving connection which extends from the engine upwardly through the housing 9 to the stud shaft 10, on which the propeller 8 is mounted.

While this type of remote drive may take various forms, in the embodiment illustrated it consists of a bevelled ring gear 11 mounted on a shaft 12, which is driven from the engine 7 through a form of flexible coupling 13, which, in the form illustrated, is a fluid drive coupling. This drive transmits a rotary motion from the crank shaft of the engine 7 to the ring gear 11. The gear 11 in turn drives a similar bevelled ring gear 14 on the bottom of a vertical shaft 15, which is mounted in and supported for rotary movement in the housing 9. The usual roller or ball bearings are used to reduce friction as illustrated, and a forced feed lubrication system (not shown) picks up oil from the bottom of a sump 16 at the base of the housing 9 and forces it through a conduit 17 to lubricate the upper gearing assembly 18 and 19, and flood the various bearings in the housings 9 and 16 with oil. The bevelled ring gear 18 mounted at the top of the shaft 15 drives the gear 19 which drives the stud shaft 10 on which the propeller 8 is mounted. The upper gear assembly is enclosed in a housing 20.

While this embodiment of my invention shows only one propeller and one engine, it will be understood that multiple propellers and multiple engines may be used.

In order to prevent the transmission of vibrations from the engine to the propeller and thence to the airplane, or from the propeller to the airplane because of backlash in the driving connections, the engine or engines 7 are connected so as to drive the propeller or propellers through a flexible coupling to the drive means, which will reduce or eliminate entirely these vibrations.

In the form of flexible coupling illustrated in Figures 3, 4, 5 and 6, the engine flywheel 21 is formed as one part of a fluid drive coupling, which consists of the impeller member 22 having a semi-circular face 23, provided with a series of vanes 24 and with a central open portion 25. The other part of the fluid drive coupling consists of the impelled or driven member 26, which is secured firmly to the shaft 12 by the studs 26a and is shaped similarly to the member 22 with a semi-circular recessed portion 27 having vanes 28 and a cut out portion 29 therein, said parts 22 and 26 being so arranged that when oil or other driving fluid is in the space between the driving and driven members 22 and 26 on rotation of the driving member the vanes 24 will set up a rotational movement of the oil which in turn will be transmitted to the vanes 28 of driven member 26, causing the driven member 26 to rotate solely by the transmission of power through the fluid connecting these two members, as in the type of coupling shown, for example, in the Föttinger United States Letters Patent No. 1,199,364, granted September 26, 1916.

A housing 30, connected to the driving member 22 and having a sliding connection with the hub 31 of the driven member 26 through an oil seal 32, holds the oil or other driving fluid in the housing formed by the flywheel 21 and the cover 30, while the centrifugal force set up by the rotation of the flywheel tends to force the oil to the outer circumference of the housing formed by the flywheel 21 and the cover 30 where it has its greatest effect in driving the driven member 26 from the driving member 22. By the use of this type of flexible coupling, vibrations due to the uneven explosion in the engine cylinders or due to backlash, whip or play in the driving connection to the propeller are largely eliminated as the fluid coupling between the engine and the propeller drive means prevents the transmission of vibrations from the engine to the propeller drive means and from the propeller drive means back to the engine or the airplane. It is possible by mean of such a flexible coupling to locate the propeller at a point remote from the engine and drive the propeller without setting up vibrations which are objectionable, as to thus render airplanes of this type in which the propeller is located at a point remote from and out of line with the engine crank shaft satisfactory for commercial use.

Other types of flexible connection between the engine and the propeller of an airplane located at a point remote from and out of line with the engine crank shaft may be used.

In the form of embodiment of flexible coupling for this purpose indicated in Figure 7, the crank shaft of the engine is shown at 40, and the flywheel 41 is connected to the shaft 42, which drives gearing means driving the propeller, by means of a flexible rubber coupling. This flexible rubber coupling 43 extends between the flywheel 41 and a drive ring 44, which is mounted on the shaft 42 and is connected to each of these members. This type of flexible coupling 43 may be in various forms, such as illustrated, for example, in the Lord et al. United States Letters Patent No. 2,101,078, granted December 7, 1937. The continuous ring 43 of rubber or a series of flexible rubber connections between the driving member 41 and the driven member 44, which will stretch and return to normal as unusual strains or stresses are placed thereon, will equalize and remove the vibrations which would otherwise be transmitted from the engine to the propeller drive means, or from the propeller drive means to the engine if no flexible coupling were used, and thereby provide an airplane of this type which is free from objectionable vibrations.

Other types of flexible couplings which can be used in airplane constructions in which the propeller is located at a point remote from and out of line with the engine crank shaft are illustrated in United States Letters Patent to Hicks, No. 700,773, granted May 27, 1902, and in United States Letters Patent to Westinghouse et al., No. 492,898, granted March 7, 1893. While I have used these various forms of flexible coupling in airplane drives of the type described herein, I prefer to use the fluid drive type of flexible coupling because of its inherently greater flexibility and freedom from mechanical breakage when unusual strains are placed thereon.

It is to be understood that while I have illustrated the application of my invention to a single engine airplane with a single propeller, the principle of using a flexible coupling between the engine or engines and the propeller or propellers of an airplane, which are located at a point remote from the engine and out of line with the engine crank shaft, can readily be applied to airplanes using a plurality of engines and a plurality of propellers, or to airplanes using one or more engines to drive a plurality of propellers, and that my invention is not limited to the specific design herein illustrated, but covers all applications of the principles herein described which are included within the scope of the appended claims.

I claim:

1. In an airplane of the type described having a fuselage, wings connected to each side of the fuselage, an engine mounted in the fuselage, generally in the plane of said wings and near the top of the fuselage, a propeller located above the engine and fuselage at a point remote from the engine and out of line with the engine crank shaft, and driving means between the engine and the propeller whereby the propeller may be driven from the engine, said driving means comprising a horizontal drive shaft in line with the engine crank shaft, an upwardly extending driven shaft at right angles to the engine crank shaft, and a horizontal propeller shaft with means to drive one shaft from the other, a casing extending upwardly around said upwardly extending driven shaft and carrying means to support said horizontal propeller shaft, said casing and horizontal propeller shaft being located outside the vertical planes in which the engine would be moved upwardly to remove the engine from the fuselage and not extending over the engine, and means to drive the horizontal drive shaft from the engine crank shaft, including an impeller member having recesses therein for the reception of a driving fluid, and vanes for setting up a rotational movement of said driving fluid, an impelled member having recesses for receiving a driving fluid and vanes to be impelled by a driving fluid, a driving fluid between said impeller member and said impelled member, and means to prevent escape of said driving fluid.

2. In an airplane of the type described a fuselage, wings, connected to the fuselage, an engine mounted in the fuselage generally in the plane of said wings, a propeller mounted for rotational movement above the engine and wings, and means to drive the propeller from the engine, including a horizontal driven shaft in line with the axis of the crank shaft of the engine, a vertical drive shaft driven from said horizontal driven shaft and extending upwardly therefrom, a horizontal propeller shaft at the top of said vertical drive shaft and driven therefrom and extending from the side of the vertical shaft which is away from the engine, on which the propeller is mounted, a casing surrounding said vertical drive shaft and carrying means at the top thereof to support said horizontal propeller shaft, said casing, vertical drive shaft and propeller shaft being outside the vertical plane of the engine and not extending over the engine, whereby the casing, vertical drive shaft and the propeller may be removed without removing the engine or the engine may be removed without removing the casing, vertical drive shaft and propeller shaft, and means to prevent the transmission of vibrations through said driving connections, including a flexible vibration absorbing drive coupling between said engine and said horizontal driven shaft.

3. In an airplane of the type described having a fuselage, wings, connected to the fuselage, an engine mounted in the fuselage generally on the level of said wings and near the top of the fuselage, a propeller mounted above the engine, fuselage and wings and at the rear thereof, a propeller shaft on which the propeller is mounted, said propeller shaft extending rearwardly from the engine and not projecting over the engine, a support for the propeller shaft mounted at the rear of the engine and not projecting over the engine, and means to drive the propeller shaft from the engine, including transmission shafts and gearing, one of said transmission shafts being in line with the axis of the engine crank shaft, another of said transmission shafts being at right angles to the engine crank shaft, and means to transmit rotational movement between the engine crank shaft and said transmission shafts, including an impeller member mounted on the engine crank shaft, an impelled member mounted on one of said transmission shafts, a fluid confined between said members, and vanes on the impeller and impelled member for transmitting rotational movement of one to the other solely through the fluid confined between said members.

4. In an airplane of the type described a fuselage, wings, connected with the fuselage, an engine mounted in the fuselage at the rear of the cockpit and adjacent the top of the fuselage and generally in line with the wings, a propeller mounted above the wings and at the rear thereof, and means to drive the propeller from the engine, including a horizontal driven shaft in line with the axis of the crank shaft of the engine, a vertical drive shaft driven from said horizontal driven shaft and extending upwardly therefrom, a horizontal propeller shaft at the top of said vertical drive shaft and driven therefrom and extending from the side of the vertical drive shaft opposite the engine, on which the propeller is mounted, and a casing extending upwardly around the vertical drive shaft and supporting the propeller shaft, said casing being outside the vertical planes in which the engine would be moved upwardly to remove the engine from the fuselage, and means to prevent the transmission of vibrations through said driving connections, including an impeller member mounted on the engine crank shaft, an impelled member mounted on said horizontal driven shaft, a fluid confined between said members, and vanes on the impeller and impelled member for transmitting rotational movement of one to the other solely through the fluid confined between said members.

5. In an airplane of the type described, a fuselage, wings connected to the fuselage, an engine mounted in the fuselage generally on the level of said wings and near the top of the fuselage, a propeller and a horizontal propeller shaft located at the rear of and above the engine, wings and fuselage and means to drive the propeller from the engine, including a horizontal driven shaft in line with the axis of the crank shaft of the engine, a vertically disposed drive shaft driven from said horizontal driven shaft, said horizontal propeller shaft on which the propeller is mounted, being located at the end of said vertically disposed drive shaft and driven therefrom, a casing extending upwardly around said vertically disposed drive shaft and supporting said horizontal propeller shaft from the fuselage, said casing, said vertically disposed drive shaft and propeller shaft being entirely at the rear of the engine and not extending over the engine, and a flexible vibration absorbing coupling between said engine and said horizontal driven shaft.

VICTOR A. LARSEN.